(12) United States Patent
Hanusse

(10) Patent No.: US 8,694,566 B2
(45) Date of Patent: Apr. 8, 2014

(54) METHOD FOR DECOMPOSING AN ANHARMONIC PERIODIC SIGNAL AND CORRESPONDING COMPUTER PROGRAM

(75) Inventor: Patrick Hanusse, Pessac (FR)

(73) Assignee: Centre National de la Recherche Scientifique, Paris (FR)

( * ) Notice: Subject to any disclaimer, the term of this patent is extended or adjusted under 35 U.S.C. 154(b) by 543 days.

(21) Appl. No.: 12/986,525

(22) Filed: Jan. 7, 2011

(65) Prior Publication Data

US 2011/0238719 A1     Sep. 29, 2011

(30) Foreign Application Priority Data

Jan. 8, 2010  (FR) ...................................... 10 50106

(51) Int. Cl.
*G06F 1/02*    (2006.01)
(52) U.S. Cl.
USPC ......................................................... 708/270
(58) Field of Classification Search
None
See application file for complete search history.

(56) References Cited

U.S. PATENT DOCUMENTS 5,630,425 A * 5/1997 Panescu et al. ............... 600/508
8,135,584 B2 * 3/2012 Geiser et al. .................. 704/219

\* cited by examiner

*Primary Examiner* — Michael D Yaary
(74) *Attorney, Agent, or Firm* — Browdy and Neimark, PLLC

(57) ABSTRACT

This method for decomposing an anharmonic periodic signal, the general form of which may be expressed as $x(t)=x_0+x_1 \cos(\Phi(t))$, wherein $\Phi(t)$ is the phase of the signal, is characterized in that it consists of:
determining an expression of the phase equation $$F(\Phi) = \frac{d\Phi}{dt},$$

determining an expression of the phase $\Phi(t)$ as a function of de parameters $(r, r_k, \Phi_1, p_k)$ measuring the anharmonicity of the signal and its morphology, from $p\cos_n$ and $p\sin_n$ functions defined by:

$$p\cos_n(t, r) = \sum_{k=1}^{\infty} \cos(kt)\frac{r^k}{k^n} \text{ and } p\sin_n(t, r) = \sum_{k=1}^{\infty} \sin(kt)\frac{r^k}{k^n}.$$

6 Claims, 1 Drawing Sheet

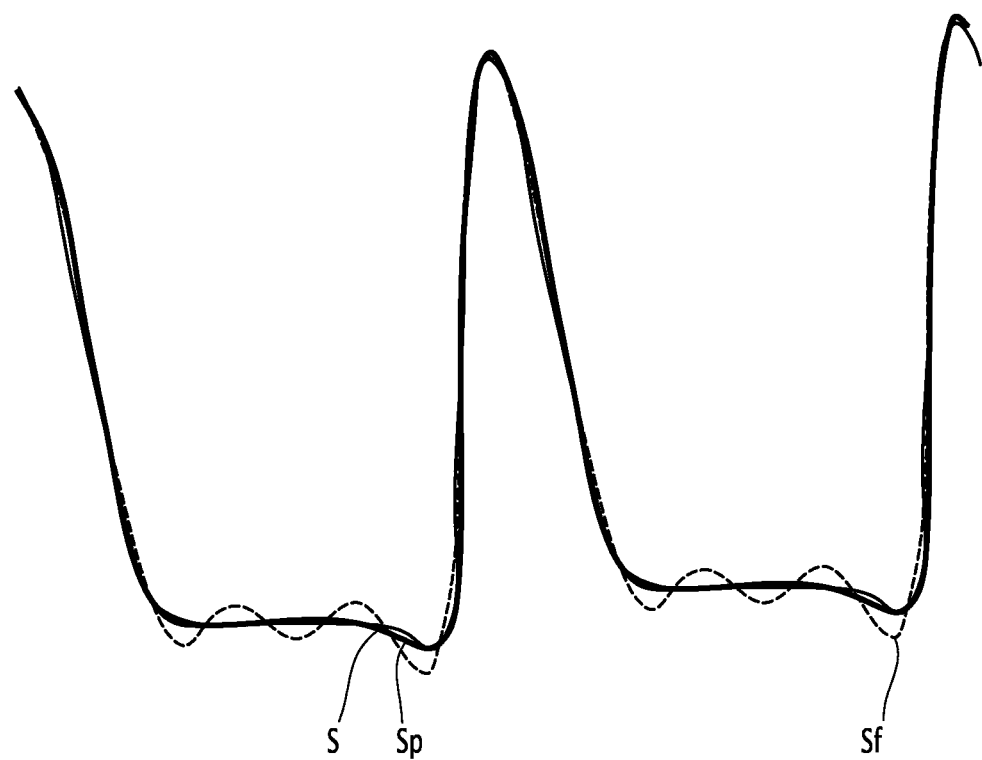

METHOD FOR DECOMPOSING AN ANHARMONIC PERIODIC SIGNAL AND CORRESPONDING COMPUTER PROGRAM

The invention relates to a method for decomposing an anharmonic periodic signal, the general form of which may be expressed as $x(t)=x_0+x_1 \cos(\Phi(t))$, wherein $\Phi(t)$ is the phase of the signal and to a corresponding computer program.

The description of periodic signals and their coding by means of parameters are an old concern: this coding allows storage of the whole information required for the synthesis of the signal, in a relatively compact way. For example, a harmonic or sinusoidal signal is entirely described by its period and its phase. It is thus possible, by giving this period and this phase to synthesize the signal.

Such a description is however not sufficient in the case of non-linear or anharmonic signals, i.e. having strong distortions relatively to a harmonic or sinusoidal signal. Such signals are encountered in systems in which strong non-linear interactions are in play, and they occur in many fields, such as laser physics, electronics, chemistry, biology or physiology.

The decomposition of such signals is generally carried out by means of Fournier series, introduced in 1822 by Joseph Fourier. This technique consists of decomposing a periodic signal of frequency f into an infinite sum of sinusoidal functions of multiple frequencies of f. Any periodic signal $x(t)$ of period $T=1/f$ may thus be expressed as a sum of sinusoidal functions, of the type:

$$x(t) = \sum_{n=-\infty}^{+\infty} c_n(x) e^{i 2\pi \frac{n}{T} t} \quad (1)$$

The coefficients $c_n$, called Fourier coefficients, which are defined by the formula:

$$c_n(x) = \frac{1}{T} \int_{-\frac{T}{2}}^{\frac{T}{2}} x(t) e^{-i 2\pi \frac{n}{T} t} \quad (2)$$

form a coding of the signal $x(t)$. From this analysis, given the coefficients $c_n$, it is possible to synthesize the signal $x(t)$.

In order to increase the compactness of this coding, the number of coefficients $c_n$, a priori infinite, should be limited and only the first terms of the expression (1) should be kept. These terms should however be in a sufficient number so that the signal synthesized from the coding is as close as possible to the original signal $x(t)$.

The decomposition Fourier series is universal, in that it allows any type of periodic signal to be decomposed. However, when the analyzed signal is not harmonic or quasi harmonic, the Fourier decomposition requires a great number of coefficients to be kept, coefficients to which it is difficult to give a physical meaning.

Now, a large number of signals, produced by systems in which the interactions are strong, involving significant non-linear contributions, are strongly anharmonic.

The object of the invention is therefore to allow analysis and representation, therefore, coding and synthesis of a periodic signal, regardless of its anharmonicity, by means of a small number of parameters, relatively to the number of parameters required for coding and synthesis by Fourier series, said parameters bearing a physical meaning and forming a simple and explicit signature of the dynamics and of the internal structure of the system which produces this signal.

For this purpose, the object of the invention is a decomposition method of the aforementioned type, characterized in that it consists of:

determining an expression of the phase equation $$F(\Phi) = \frac{d\Phi}{dt},$$

determining an expression of the phase $\Phi(t)$ as a function of parameters $(r, r_k, \Phi_0, p_k)$ measuring the anharmonicity of the signal and its morphology, from $p \cos_n$ and $p \sin_n$ functions defined by:

$$p\cos_n(t,r) = \sum_{k=1}^{\infty} \cos(kt) \frac{r^k}{k^n}$$

and $$p\sin_n(t,r) = \sum_{k=1}^{\infty} \sin(kt) \frac{r^k}{k^n}.$$

According to other aspects of the invention, the decomposition method comprises one or more of the following characteristics:

the phase equation is expressed as:

$$\frac{d\Phi}{dt} = \frac{1 + r^2 + 2r\cos(\Phi)}{1 - r^2},$$

wherein r, varying in [0,1], is a parameter measuring the anharmonicity of said signal, the signal $x(t)$ is expressed by means of two parameters r and $\Phi_0$, as:

$$x(t)=x_0+a_1 h\sin(t,r)+b_1 h\cos(t,r)$$

wherein $a_1=x_1 \cos(\Phi_0)$ and $b_1=-x_1 \sin(\Phi_0)$, the functions h sin and h cos being defined by:

$$h\cos: (t,r) \to \frac{(1+r^2)\cos(t) + 2r}{1 + r^2 - 2r\cos(t)}$$

and $$h\sin: (t,r) \to \frac{(1-r^2)\sin(t)}{1 + r^2 - 2r\cos(t)}.$$

the phase equation is expressed as:

$$F(\Phi) = \frac{P(\Phi)}{Q(\Phi)},$$

wherein P(Φ) and Q(Φ) are trigonometric polynomials, the expression of the phase Φ(t) is determined as:

$$t(\Phi) = \Phi + \sum_{k=1}^{n} a_k p\sin_1(\Phi - p_k, r_k) - b_k p\cos_1(\Phi - p_k, r_k)$$

wherein the functions p sin$_1$ and p cos$_1$ are defined by:

$$p\cos_1(t, r) = \sum_{k=1}^{\infty} \cos(kt)\frac{r^k}{k}$$

and $$p\sin_1(t, r) = \sum_{k=1}^{\infty} \sin(kt)\frac{r^k}{k}$$

The invention also relates to a computer program including lines of code which, when they are executed by a processing unit, carry out the steps of such a method for breaking down an anharmonic periodic signal, as described earlier.

Thereby achieved, the method according to the invention allows analysis of an anharmonic periodic signal by reducing the number of parameters required for its coding, as compared with the decomposition methods of the state of the art. Further, these parameters have a physical meaning, which allows comparison of several signals by directly comparing the parameters from their breaking down.

According to another aspect, the object of the invention is also a computer program including lines of code which, when they are executed, carry out the steps of the method for breaking down an anharmonic periodic signal according to the invention.

The invention will be better understood with reference to an exemplary embodiment of the invention, which will now be described with reference to the single appended FIGURE, which illustrates an exemplary anharmonic periodic signal, this signal being synthesized from a decomposition into a Fourier series.

Any simple periodic signal, i.e. having a maximum and a minimum per period, may be described in the following form:

$$x(t) = x_0 + x_1 \cos(\Phi(t)) \quad (3)$$

wherein all the time dependence is contained in the phase function Φ. Now, in an anharmonic periodic signal, the main contribution to anharmonicity stems from the breaking of symmetry of the phase dynamics. During the decomposition of the signal x(t), this phase Φ(t) should therefore be investigated and in particular the phase dynamics expressed by the function F, the time t derivative of the function Φ:

$$F(\Phi) = \frac{d\Phi}{dt} \quad (4)$$

Thus, the morphology of the signal is completely determined by the knowledge of F.

The method according to the invention therefore consists of describing this function F by means of a very small number of parameters. By a small number of parameters is meant a reduced number of parameters relatively to the number of parameters required for breaking down the same function, by means of Fourier series, with an equivalent level of accuracy.

The first step of the method according to the invention consists of expressing the phase Φ and in particular the F function, the time derivative of Φ.

In the simplest case, and for a signal of period 2π, the phase dynamics may be written as:

$$F(\Phi) = \frac{d\Phi}{dt} = \frac{1 + r^2 + 2r\cos(\Phi)}{1 - r^2} \quad (5)$$

called a phase equation.

The function F in this case has reflection symmetry relative to the axis Φ=0. This expression of the phase dynamics only contains a single parameter, r, which varies in the interval [0,1]. The limit r=0 corresponds to a harmonic signal, the limit r=1 to an infinitely anharmonic signal.

In the general case, i.e. for any periodic signal, the phase equation may be written as:

$$F(\Phi) = \frac{P_n(\Phi)}{Q_m(\Phi)} \quad (6)$$

wherein $P_n$ and $Q_m$ are trigonometric polynomials of degrees n and m respectively. The general form of a trigonometric polynomial of degree n is $$P_n(\Phi) = a_0 + \sum_{k=1}^{n} a_k \cos(k\Phi) + b_k \sin(k\Phi) \quad (7)$$

The method according to the invention, then consists of determining an expression of Φ involving a small number of parameters, which allows the determination of an expression of the signal x(t) as a function of these parameters.

For a signal having phase dynamics, which may be expressed by the equation (5), the signal x(t), which may be written as:

$$x(t) = x_0 + x_1 \cos(\Phi(t,r) - \Phi_0) \quad (8)$$

is broken down and rewritten in a form involving the parameters r and $\Phi_0$:

$$x(t) = x_0 + a_1 h \sin(t,r) + b_1 h \cos(t,r) \quad (9)$$

with $a_1 = x_1 \cos(\Phi_0)$ and $b_1 = -x_1 \sin(\Phi_0)$, and wherein the following functions h cos and h sin are defined:

$$h\cos: (t, r) \rightarrow \frac{(1 + r^2)\cos(t) + 2r}{1 + r^2 - 2r\cos(t)} \quad (10)$$

$$h\sin: (t, r) \rightarrow \frac{(1 - r^2)\sin(t)}{1 + r^2 - 2r\cos(t)} \quad (11)$$

Thus, the decomposition of the signal x(t) only involves two parameters, r and $\Phi_0$. r, called an anharmonicity parameter, measures the degree of anharmonicity of the signal. Indeed, as suggested by equation (5), the limit r=0 corresponds to a harmonic signal, the limit r=1 to an infinitely anharmonic signal. Moreover, the parameter $\Phi_0$, which defines the composition of the signal in both h cos and h sin functions, is a morphology parameter which corresponds to the reflection symmetry angle of the phase dynamics.

In the general case described by equation (6), the next step of the method according to the invention consists of solving this phase equation.

Advantageously, this equation may be rewritten as:

$$\frac{1}{F(\Phi)} = \frac{dt}{d\Phi} = \frac{Q_m(\Phi)}{P_n(\Phi)} \quad (12)$$

Factoring out the polynomial $P_n(\Phi)$ gives the possibility of the transforming $$\frac{1}{F(\Phi)}$$

into a sum of simple terms, which allows the phase equation to be rewritten as:

$$\frac{dt}{d\Phi} = a_0 + \sum_{k=1}^{n} \frac{a_k \cos(\Phi - p_k) + b_k \sin(\Phi + p_k)}{(1 + r_k^2 - 2r_k \cos(\Phi + p_k))} \quad (13)$$

The period T of the signal may be determined by integrating this function with respect to $\Phi$, between 0 and $2\pi$:

$$T = \int_{\Phi=0}^{\Phi=2\pi} \frac{d\Phi}{F(\Phi)} = 2\pi \left( a_0 + \sum_k \frac{r_k a_k}{1 - r_k^2} \right) \quad (14)$$

From this result, and the constraints according to which the period is equal to $2\pi$ and the signal is harmonic when all the coefficients $r_k$ are zero, the phase equation may be expressed as:

$$\frac{dt}{d\Phi} = 1 + \sum_{k=1}^{n} D_k(\Phi - p_k) \quad (15)$$

wherein the function $D_k$ is defined by:

$$D_k : \Phi \to \frac{r_k(a_k \cos(\Phi) + b_k \sin(\Phi) - a_k)}{(1 + r_k^2 - 2r_k \cos(\Phi))} \quad (16)$$

and verifies:

$$\int_{\Phi=0}^{\Phi=2\pi} D_k(\Phi) d\Phi = 0 \quad (17)$$

The definition of the functions of the functions poly cos and poly sin, noted as $p\cos_n$ and $p\sin_n$, which are expressed by:

$$p\cos_n(t, r) = \sum_{k=1}^{\infty} \cos(kt) \frac{r^k}{k^n} \quad (18)$$

$$p\sin_n(t, r) = \sum_{k=1}^{\infty} \sin(kt) \frac{r^k}{k^n} \quad (19)$$

and inter alia have the following properties:

$$p\cos_0(t, r) = \frac{r(\cos(t) - r)}{1 + r^2 - 2r\cos(t)} \quad (20)$$

$$p\sin_0(t, r) = \frac{r\sin(t)}{1 + r^2 - 2r\cos(t)} \quad (21)$$

$$p\cos_1(t, r) = -\frac{1}{2}\ln(1 + r^2 - 2r\cos(t)) \quad (22)$$

$$p\sin_1(t, r) = \tan^{-1}\left(\frac{r\sin(t)}{1 - r\cos(t)}\right) \quad (23)$$

allows the phase equation to be rewritten as:

$$\frac{dt}{d\Phi} = 1 + \sum_{k=1}^{n} a_k p\cos_0(\Phi - p_k, r_k) + b_k p\sin_0(\Phi - p_k, r_k) \quad (24)$$

The resolution of this equation gives access to an analytic expression of $t(\Phi)$, which is expressed by:

$$t(\Phi) = \Phi + \sum_{k=1}^{n} a_k p\sin_1(\Phi - p_k, r_k) - b_k p\cos_1(\Phi - p_k, r_k) \quad (25)$$

Thus, by applying the method according to the invention it is possible to express the time t as a function of the phase $\Phi$, and dually the phase $\Phi$ as a function of the time t, with clearly defined independent parameters, which measure the anharmonicity (parameters r or $r_k$), and morphology (parameters $\Phi_0$ or $p_k$).

With this decomposition, which applies to any anharmonic periodic signal, it is thereby possible to code such a signal by means of a small number of parameters. Indeed, regardless of the degree of nonlinearity of the signal, giving one or two pairs of parameters is sufficient for synthesizing the signal satisfactorily, i.e. so that the signal and its representation cannot be distinguished visually from each other.

Thus, in most cases, an anharmonic signal will be described in a quasi-exact way by a period, and an amplitude, a harmonicity r and a morphology $\Phi_0$. In other cases, two pairs of parameters ($r_k$, $p_k$) will be required, completed with their respective weights.

An example of the decomposition and then of the synthesis of an anharmonic periodic signal is illustrated in the single FIGURE. In this FIGURE, an anharmonic periodic signal S is notably illustrated. This signal S may be broken down following the method according to the invention. For this purpose, its phase equation is expressed according to equation (6), which once it is solved, allows determination of the expression of t as a function of $\Phi$ given by equation (25), i.e. the parameters ($r_k$, $p_k$), as well as the parameters ($a_k$, $b_k$). The signal S may thereby be broken down into a sum of signals, entirely determined by giving these parameters.

It is then possible by only giving these parameters, the period and the amplitude of the signal, to synthesize the latter. Now, a small number of these parameters may be sufficient for synthesizing a signal, the representation of which is visually very close to the original signal. Thus, when a single term of the expression (25) is kept, the form as reduced as possible, this expression then being written as:

$$t = \Phi + 1.15 p \sin_1(\Phi - 2.65, 0.96) \quad (26)$$

the synthesized signal (Sp) is very difficult to distinguish from the original signal, as shown in the illustration of FIG. 1.

The decomposition of the signal, with good accuracy, then only requires three parameters (period, amplitude, and parameter $a_1$). As a comparison, the signal Sf synthesized from its Fourier series decomposition, while keeping 3 modes (6 parameters), is also illustrated in the FIGURE.

This example thus shows that the method according to the invention allows decomposition of a signal and coding of the latter by means of a restricted number of parameters, and this with greater accuracy than the Fourier series decomposition.

Further, unlike the Fourier coefficients, the parameters determined during the decomposition following the method according to the invention have a strong physical meaning and provide a description of the anharmonicity and morphology of the signal.

The method according to the invention may advantageously be applied in the many fields in which occur anharmonic periodic signals, and provides an optimum representation thereof.

Notably, such signals have a great importance in anharmonic echography. In this field, nonlinear signals are produced by ultrasonic contrast agents and have to be distinguished from the echographic signal from the tissues. Up to now, the signals are detected by simply evaluating the amplitude of the first harmonic. Now, the analysis and the decomposition of these signals following the method according to the invention allow these signals to be coded by means of two parameters r and $\Phi_0$, which are much more accurate measurements and discriminate the nonlinearity of a signal. In many situations, this is sufficient for distinguishing non-linear signatures of tissues of different natures, and in particular of the healthy and pathological tissues. Echographic imaging is formed by mapping the different anharmonicity and morphology parameters.

The method according to the invention may also be used for analyzing physiological signals such as electrocardiograms, which consist of the superposition of several strongly non-linear signals. The decomposition of these signals following the method according to the invention allows characterization of the morphology of these electrocardiograms by means of reliable objective parameters. Fine and reliable characterization of these signals provides an aid for diagnosis or automatic diagnosis, in early steps of certain pathologies, and simple and relevant comparisons allow monitoring of a patient's condition.

Likewise, the method according to the invention allows characterization of signals associated with respiratory handicaps, their diagnosis and monitoring of these disorders, such as sudden infant death or sleep apnoea. The relevance of the morphological parameters of the respiratory signals allows efficient and tolerated control of the respirators in the case of non-invasive ventilation.

Moreover, audiophonic signals which have strong anharmonicity, are generally, characterized with the Fourier approach. In this field, decomposition of the signals with the method according to the invention, notably allows coding of these signals with a more restricted number of parameters. This compactness allows reduction of the space required for storing these signals, increase in the throughput of the transmission channels and improvement in the quality of reproducing re-synthesized sounds. The representation of the signals according to the method of the invention also allows filtering which preserves non-linear properties, unlike the lowpass filtering of the Fourier space, for example, and easily allows frequency corrections, which preserve the tone properties.

With this same method, it is possible to model musical instruments, the non-linear components of which may be described by objective, reliable parameters, few in number, allowing more performing synthesizers to be produced.

This method according to the invention may be efficiently used for voice recognition or identification, the non-linear components of which are strong and form a discriminating signature. In the same way, the method may be used for characterizing phoniatric and phonologic disorders and evaluating their development.

The same method according to the invention may be advantageously used for characterizing non-linear acoustic properties of materials and diagnosing mechanical properties, defining behavioral profiles, detecting defects or fine comparisons or a time-dependent change in the elastic properties of materials or of structures under non-linear conditions under strong stresses, a typical situation of tires to only mention an example.

In the same way, identification and modeling of a sonic or supersonic signature (sonar, sonic bang, noise pollution) by means of anharmonicity parameters may contribute to improving the design of mechanical systems in avionics, aeronautics, automotive and transportation industry.

The method according to the invention may also be used in the field of telecommunications in situations where the non-linear behavior may be utilized for coding information by means of anharmonicity parameters forming a high throughput non-linear carrier.

Such a method may for example be applied by a corresponding computer program on-board a corresponding processing unit and may find many applications as indicated earlier.

The invention claimed is:

1. A method for decomposing an anharmonic periodic signal, the method implemented in a processing unit executing a computer program composed of lines of code stored in a non-transitory computer readable medium, the general form of which signal is expressed by $x(t) = x_0 + x_1 \cos(\Phi(t))$, wherein $\Phi(t)$ is the phase of the signal and t is the time, the processing unit being programmed to execute the steps comprising:
  determining an expression of the phase equation $$F(\Phi) = \frac{d\Phi}{dt},$$

determining an expression of the phase $\Phi(t)$ as a function of parameters measuring the anharmonicity of the signal and its morphology, from $p\cos_n$ and $p\sin_n$ functions defined by:

$$p\cos_n(t, r) = \sum_{k=1}^{\infty} \cos(kt) \frac{r^k}{k^n} \text{ and } p\sin_n(t, r) = \sum_{k=1}^{\infty} \sin(kt) \frac{r^k}{k^n}.$$

2. The method for decomposing an anharmonic periodic signal according to claim 1, wherein the phase equation is expressed as:

$$\frac{d\Phi}{dt} = \frac{1 + r^2 + 2r\cos(\Phi)}{1 - r^2},$$

wherein r, varying in [0,1], is a parameter measuring the anharmonicity of said signal.

3. The method for decomposing an anharmonic periodic signal according to claim 2, wherein the signal x(t) is expressed by means of two parameters r and $\Phi_0$, as:

$$x(t) = x_0 + a_1 h\sin(t,r) + b_1 h\cos(t,r)$$

wherein $a_1 = x_1 \cos(\Phi_0)$ et $b_1 = x_1 \sin(\Phi_0)$, the h sin and h cos functions being defined by:

$$h\cos : (t, r) \rightarrow \frac{(1 + r^2)\cos(t) + 2r}{1 + r^2 - 2r\cos(t)}$$

and $$h\sin : (t, r) \rightarrow \frac{(1 + r^2)\sin(t)}{1 + r^2 - 2r\cos(t)}.$$

4. The method for decomposing an anharmonic periodic signal according to claim 1, wherein the phase equation is expressed as:

$$F(\Phi) = \frac{P(\Phi)}{Q(\Phi)},$$

wherein $P(\Phi)$ and $Q(\Phi)$ are trigonometric polynomials.

5. The method for decomposing an anharmonic periodic signal according to claim 4, wherein the expression of the phase $\Phi(t)$ is determined as:

$$t(\Phi) = \Phi + \sum_{k=1}^{n} a_k p\sin_1(\Phi - p_k, r_k) - b_k p\cos_1(\Phi - p_k, r_k)$$

wherein the $p\sin_1$ and $p\cos_1$ functions are defined by:

$$p\cos_1(t, r) = \sum_{k=1}^{\infty} \cos(kt)\frac{r^k}{k}$$

and $$p\sin_1(t, r) = \sum_{k=1}^{\infty} \sin(kt)\frac{r^k}{k}.$$

6. A computer program including the lines of code stored in the non-transitory medium, which lines of code, when they are executed by a processing unit, achieve the steps of the method for decomposing an anharmonic periodic signal according to claim 1.

* * * * *